(12) United States Patent
Kraus et al.

(10) Patent No.: US 10,864,644 B2
(45) Date of Patent: Dec. 15, 2020

(54) ELECTRIC APPLIANCE FOR PERSONAL CARE

(71) Applicant: Braun GmbH, Kronberg (DE)

(72) Inventors: Bernhard Kraus, Braunfels (DE); Thomas Verstege, Frankfurt am Main (DE); Uwe Schober, Glashuetten (DE); Frank Ziegler, Karben (DE)

(73) Assignee: Braun GMBH, Kronberg (DE)

( * ) Notice: Subject to any disclaimer, the term of this patent is extended or adjusted under 35 U.S.C. 154(b) by 70 days.

(21) Appl. No.: 15/950,597

(22) Filed: Apr. 11, 2018

(65) Prior Publication Data

US 2018/0311841 A1  Nov. 1, 2018

(30) Foreign Application Priority Data

Apr. 27, 2017 (EP) .................................. 17168474

(51) Int. Cl.
| | |
|---|---|
| *B26B 19/04* | (2006.01) |
| *B26B 19/28* | (2006.01) |
| *H02K 33/18* | (2006.01) |
| B26B 19/38 | (2006.01) |
| B62D 11/14 | (2006.01) |
| F16F 1/18 | (2006.01) |

(52) U.S. Cl.
CPC .......... *B26B 19/048* (2013.01); *B26B 19/288* (2013.01); *H02K 33/18* (2013.01); *B26B 19/282* (2013.01); *B26B 19/38* (2013.01); *B62D 11/14* (2013.01); *F16F 1/185* (2013.01); *H02K 2213/03* (2013.01)

(58) Field of Classification Search
CPC ..... B26B 19/048; B26B 19/288; B26B 19/38; H02K 33/18; H02K 2213/03; B62D 11/14; F16F 1/185; F16F 15/022
USPC ................................................... 248/560–570
See application file for complete search history.

(56) References Cited

U.S. PATENT DOCUMENTS

| | | |
|---|---|---|
| 3,749,951 A | 7/1973 | Artin et al. |
| 3,800,172 A | 3/1974 | Artin et al. |
| 4,156,882 A | 5/1979 | Delagi et al. |

(Continued)

FOREIGN PATENT DOCUMENTS

| | | |
|---|---|---|
| EP | 674979 A1 | 10/1995 |
| EP | 1548917 B1 | 5/2010 |

(Continued)

OTHER PUBLICATIONS

European search report dated Nov. 8, 2017.

(Continued)

*Primary Examiner* — Andrea L Wellington
*Assistant Examiner* — Liang Dong
(74) *Attorney, Agent, or Firm* — Kevin C. Johnson

(57) ABSTRACT

The present invention relates to electric appliances for personal care, in particular electric shavers, comprising a magnetic linear drive unit having first and second drive components supported for linear displacement relative to each other by a spring device and adapted to magnetically interact with each other. The spring device includes at least one leaf spring having a constricted section in a central region of the leaf spring, wherein surfaces of the at least one leaf spring neighboring the constricted section are shaped convex. Such convex surfaces may have a parabolic contour.

22 Claims, 6 Drawing Sheets

(56) References Cited

U.S. PATENT DOCUMENTS

| | | | |
|---|---|---|---|
| 4,240,200 | A | 12/1980 | Bukoschek |
| 5,559,378 | A | 9/1996 | Oudet et al. |
| 5,632,087 | A * | 5/1997 | Motohashi ............ B26B 19/282 30/43.9 |
| 7,053,507 | B2 | 5/2006 | Kobayashi et al. |
| 7,304,407 | B2 * | 12/2007 | Sanematsu ............ H02K 33/16 310/12.24 |
| 7,334,338 | B2 | 2/2008 | Shiba et al. |
| 7,841,090 | B2 | 11/2010 | Eichhorn et al. |
| 8,373,315 | B2 | 2/2013 | Kobayashi et al. |
| 8,464,429 | B2 | 6/2013 | Haczek et al. |
| 8,731,186 | B1 | 5/2014 | Hadad |
| 8,806,756 | B2 | 8/2014 | Kraus et al. |
| 9,127,366 | B2 | 9/2015 | Matsuda et al. |
| 9,768,675 | B2 | 9/2017 | Andrikowich et al. |
| 2002/0134484 | A1 | 9/2002 | Erb, Jr. |
| 2002/0175239 | A1 | 11/2002 | Momoi et al. |
| 2007/0035860 | A1 | 2/2007 | Adachi et al. |
| 2008/0130169 | A1 | 6/2008 | Kitamura |
| 2009/0025229 | A1 | 1/2009 | Kappes et al. |
| 2009/0165305 | A1 | 7/2009 | Kraus et al. |
| 2009/0211101 | A1 | 8/2009 | Azar et al. |
| 2012/0125699 | A1 * | 5/2012 | Guthrie ................. B60G 11/00 177/225 |
| 2014/0054980 | A1 | 2/2014 | Andrikowich et al. |
| 2015/0097322 | A1 * | 4/2015 | Rarey ..................... B60G 7/001 267/40 |
| 2015/0145187 | A1 * | 5/2015 | Soles ..................... B60G 11/42 267/30 |
| 2015/0249893 | A1 | 9/2015 | Broberg et al. |
| 2016/0120330 | A1 * | 5/2016 | DeFranks .......... A47C 23/0438 5/655.7 |
| 2016/0176059 | A1 | 6/2016 | Ring et al. |
| 2016/0181901 | A1 | 6/2016 | Kraus et al. |
| 2018/0311842 | A1 | 11/2018 | Kraus et al. |
| 2018/0311843 | A1 | 11/2018 | Kraus et al. |
| 2018/0319028 | A1 | 11/2018 | Kraus et al. |

FOREIGN PATENT DOCUMENTS

| | | |
|---|---|---|
| EP | 3038242 A1 | 6/2016 |
| EP | 2434626 B1 | 11/2018 |
| GB | 2014372 A | 8/1979 |
| JP | 2000295833 | 10/2000 |
| JP | 2005354879 | 12/2005 |
| JP | 4487650 B1 | 6/2010 |
| WO | 0310395 A1 | 12/2003 |
| WO | 2008009322 A1 | 1/2008 |

OTHER PUBLICATIONS

European Search Opinion and Report; EP Application No. 17168466.5; dated Nov. 3, 2017; European Patent Office.

European Search Opinion and Report; EP Application No. 17168469.9; dated Oct. 27, 2017; European Patent Office.

European Search Opinion and Report; EP Application No. 17168473.1; dated Nov. 9, 2017; European Patent Office.

Written Opinion of the International Searching Authority; International Application No. PCT/IB2018/0052506; dated Jul. 13, 2018; European Patent Office; Munich, Germany.

Written Opinion of the International Searching Authority; International Application No. PCT/IB2018/052502; dated Jul. 31, 2018; European Patent Office; Munich, Germany.

Written Opinion of the International Searching Authority; International Application No. PCT/IB2018/052507; dated Jul. 17, 2018; European Patent Office; Munich, Germany.

Written Opinion of the International Searching Authority; International Application No. PCT/IB2018/052503; dated Jul. 10, 2018; European Patent Office; Munich, Germany.

Mullins, Burton S.; Final Office Action; U.S. Appl. No. 15/950,627; dated Mar. 20, 2020; United States Patent and Trademark Office; Alexandria, Virginia.

Mullins, Burton S.; Office Action; U.S. Appl. No. 15/950,627; dated Oct. 18, 2019; United States Patent and Trademark Office; Alexandria, Virginia.

https://www.stainless-steel-world.net/basicfacts/stainless-steel-and-its-families.html; Accessed Sep. 26, 2019 (Year: 2019).

https://en.wikipedia.org/wiki/Mu-metal; Accessed Sep. 26, 2019 (Year: 2019).

Kim, John K.; Notice of Allowance; U.S. Appl. No. 15/950,572; dated Mar. 26, 2020; United States Patent and Trademark Office; Alexandria, Virginia.

Kim, John K.; Office Action; U.S. Appl. No. 15/950,572; dated Nov. 27, 2019; United States Patent and Trademark Office; Alexandria, Virginia.

Kim, John K.; Office Action; U.S. Appl. No. 15/950,657; dated Jan. 30, 2020; United States Patent and Trademark Office; Alexandria, Virginia.

Kim, John K.; Office Action; U.S. Appl. No. 15/950,657; dated Apr. 16, 2020; United States Patent and Trademark Office; Alexandria, Virginia.

* cited by examiner

ELECTRIC APPLIANCE FOR PERSONAL CARE

FIELD OF THE INVENTION

The present invention relates to electric appliances for personal care, in particular electric shavers, comprising a magnetic linear drive unit having first and second drive components connected to each other by means of a spring device for linear displacement relative to each other and adapted to magnetically interact with each other. More particularly, the present invention relates to such spring device and a magnetic linear drive unit having such spring device.

BACKGROUND OF THE INVENTION

Small sized electric appliances for personal care often include functional elements or working tools driven by an electric-type, more particularly magnetic-type drive unit which may be received within a housing element that may form a handpiece to be handheld or a tool head connected thereto.

For example, electric shavers may have one or more cutter elements driven by an electric drive unit in an oscillating manner where the cutter elements reciprocate under a shear foil, wherein such cutter elements or undercutters may have an elongated shape and may reciprocate along their longitudinal axis. Other types of electric shavers use rotatory cutter elements which may be driven in an oscillating or a continuous manner. The said electric drive may include an electric or magnetic type linear motor, wherein the drive unit may include an elongated drive transmitter for transmitting the driving motion of the motor to the cutter element.

Such drive systems include sometimes linear-type drive units comprising first and second drive components reciprocating or oscillating relative to each other in a substantially linear manner, i.e. substantially along linear axes, wherein the driving forces may result from magnetic fields. Said drive components usually form the active parts of the linear electric motor and are configured to provide for the driving forces due to magnetic interaction with each other. For example, one of the drive components may include a permanent magnet, whereas another one of the drive components may include one or more magnetic coils to which pulsating electric current is applied to create pulsating magnetic fields, thereby causing the two drive components to oscillate relative to each other. Thus, said drive components are usually different from driven parts of the electric appliance such as the tools to be driven or transmitter parts driven by the linear motor and driving said tools. More particularly, at least one of said drive components may be connected to a tool of the electric appliance such as an undercutter or a shaver or a brush carrier of a toothbrush so as to drive said tool. At least one of the drive components connects to a transmission train transmitting the oscillating movement of the drive component onto the functional element to be driven such as the aforementioned cutter element, wherein such transmission train may include a transmitter pin directly connecting to the cutter element or indirectly connected thereto by means of a yielding bridge structure allowing for pivoting movements of the cutter element.

For example, US 2009/0025229 A1 or U.S. Pat. No. 7,841,090 B2 discloses an electric shaver having a pair of cutter elements provided under a shear foil and driven in an oscillating manner. Furthermore, WO 03/103905 A1 and EP 0 674 979 A1 disclose linear oscillating drive units for shavers, wherein the drive components oscillating relative to each other in a linear manner include a permanent magnet on the one hand and a magnetic coil on the other hand.

In such systems, one of the drive components may be rigidly connected to a mounting structure or the installation environment which is often a handpiece or a tool head formed by a housing part of the electric appliance in which the drive unit is received. For example, the permanent magnet may be rigidly supported or fixedly connected to an interior side of the handpiece via a drive carrier or a mounting structure connected thereto, whereas the other drive component including the magnetic coils may be movably supported on said drive carrier for allowing the linear oscillation, for example by means of a plastic spring device including leaf springs or c-shaped springs as shown by EP 15 48 917 B1.

Furthermore, WO 03/103905 A1 suggests to not fix one of the drive components, but to fix the linkage or pendulum bars linking the two drive components to each other, to the drive carrier and thus, to the installation environment in terms of an inner portion of the handpiece housing. Such fixing of the pendulum bearing to the drive carrier allows both drive units to oscillate in the direction of the oscillation axis in a sort of reverse motion. When a first drive component moves to the left, the other drive component moves to the right, and vice versa. Such reverse oscillation may reduce the aforementioned undesired vibrations of the handpiece.

However, due to tolerances of the drive components and/or phase offset, there may be mismatch of the dynamic effects of the reverse motions and thus, vibrations that can be felt in the hand holding the handpiece. Furthermore, due to restrictions of the oscillating amplitude of the drive components and restrictions in the mounting space, the cutter elements at the shaver head sometimes cannot be driven at the desired oscillation amplitude.

EP 3 038 242 A1 suggests a linear motor for a shaver with two separate spring devices, wherein a first spring device forms a resonance spring connecting the two drive components of the drive unit to each other and a second spring device forms a suspension spring connecting the drive unit to a mounting structure fixed to the shaver's housing forming the handle thereof. Due to such second spring device, the entire drive unit may move relative to the shaver's handle, thereby reducing transmission of vibrations onto the handle.

Such multiple spring devices may help in keeping vibrations away from the handle. However, it is rather difficult to achieve an efficient transmission of the oscillation to the working tool with large amplitudes and stable frequency, but still allow for a simple structure of the spring device system and efficient mounting and manufacturing thereof. More particularly, in order to achieve stable operation at the desired frequencies with stable amplitudes, the spring system needs to have a high stiffness what implies certain restrictions onto the material and dimensions of the spring elements and the connections between the spring elements and the components linked thereto.

So as to achieve efficient driving with large amplitudes at a stable frequency, it also can be helpful to have lightweight resonance springs providing for rather high stiffness. As spring stiffness could be increased by means of increasing the springs' dimensions, whereas lightweight could be achieved by means of reducing the springs' dimensions, it is desired to efficiently utilize the material and dimensions of the springs.

For example, document JP 44-87650 A1 suggests a spring for a linear motor having leaf springs with a waisted shape providing for a constricted section in a central region of the leaf spring. When considering the cross-section of such leaf springs, the thickness of the leaf springs continuously, slightly increases from a center section of the leaf spring towards each of opposite ends thereof, so that the cross-sectional shape becomes slightly concave, as can be seen from FIG. 8 showing a prior art leaf spring with such waisted shape and concave surfaces. However, such "waisted" leaf springs still show non-uniform stress distribution, in particular when the springs are subject to multi-axial loads.

SUMMARY OF THE INVENTION

It is an objective underlying the present invention to provide for an improved electric appliance for personal care avoiding at least one of the disadvantages of the prior art and/or further developing the existing solutions. A more particular objective underlying the invention is to provide for an improved drive unit with a simple structure that can be easily manufactured and mounted, but still achieves high driving performance.

More particularly, an improved spring structure for the drive unit is desired to provide for sufficient stiffness to allow for efficient transmission of oscillations without sacrificing easy mounting and manufacturing.

Specifically, it is an objective to provide for an improved spring structure allowing for a uniform stress distribution even under multi-axial loads, thus achieving a high spring stiffness and good responsiveness in combination with a small, space-saving spring configuration.

A still further objective is to allow for less restrictions on design of the drive unit structure without reducing performance characteristics such as stable oscillation frequencies, sufficient amplitudes and low vibrations. Another objective is to avoid complicated mounting structures and to allow for efficient installation of the drive unit components to the spring structure.

To achieve at least one of the aforementioned objectives, the spring device includes at least one leaf spring having a constricted section in a central region of the leaf spring, wherein the surfaces of the leaf spring neighboring said constricted section have a convex shape providing for a thickness of the leaf spring slightly increasing from the constricted section towards opposite ends of the leaf spring, wherein the degree of increase in thickness slightly decreases towards the opposite ends of the leaf spring.

Said convex surfaces of the leaf spring may have a parabolic contour.

More particularly, the leaf spring's cross-section may be defined by a pair of parabolas facing each other with their culmination points in a central region of the leaf spring so that the leaf spring's outer contour is convex except a constricted section in said central region forming a transitional section between said pair of parabolas.

Said pair of parabolas defining the cross-sectional contour of the leaf spring may be parabolas of a higher degree.

These and other advantages become more apparent from the following description giving reference to the drawings and possible examples.

DETAILED DESCRIPTION OF THE INVENTION

Figure 1:
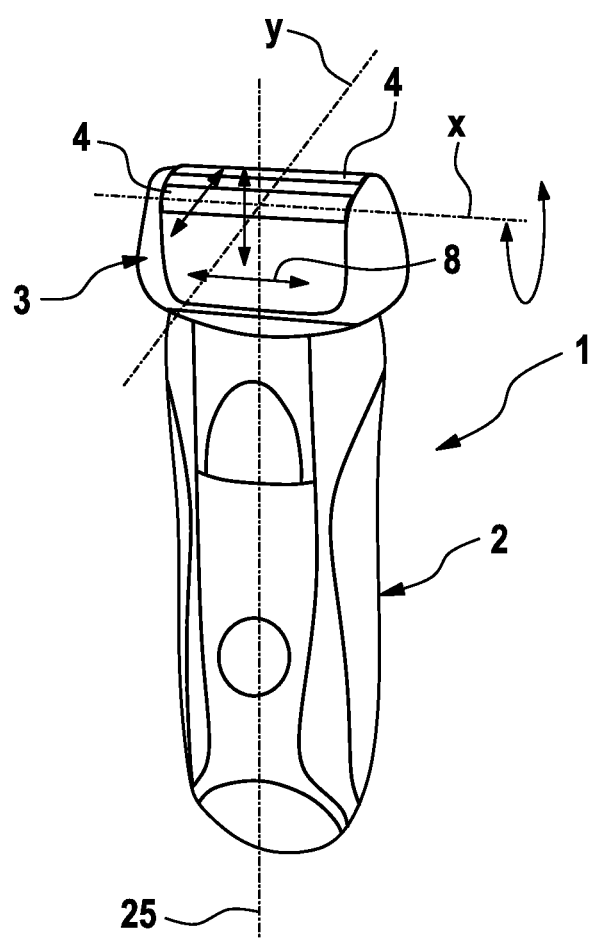
FIG. 1: is a perspective partial view of a small-sized electric appliance for personal care in terms of an electric shaver having a shaver head including two cutter elements drivable in an oscillating manner by a linear type drive unit received within the shaver housing forming the shaver's handpiece.

In order to achieve high stiffness of the spring device with a space-saving and material-saving configuration, it is suggested the spring device includes at least one leaf spring having surfaces with a convex contour the shape of which may be parabolic. Due to such convex, in particular parabolic-shaped surfaces of the leaf spring, high spring forces can be provided while stresses in the spring body can be kept low. The material of the leaf spring is completely or almost completely utilized as a uniform stress distribution is achieved. In particular, basically the same stress level can be achieved in the edge layer or surface layer of the leaf spring when such surface layer follows the parabolic contour.

More particularly, main surfaces of the leaf spring extending substantially parallel to a neutral axis of the leaf spring (which neutral axis can be considered the axis where stresses remain zero when bending the leaf spring) and extending from a neck-shaped center section of the leaf spring towards opposite ends thereof may have such convex surface shape so that the main surfaces of the leaf spring are substantially entirely convex except said constricted section in the center region of the leaf spring.

Due to the convex shape of the leaf spring surfaces neighboring the constricted center section, the thickness of the leaf spring slightly increases from said constricted center section towards the opposite ends of the leaf spring, wherein said increase in thickness slightly becomes smaller towards the opposite ends. In other words, close to the constricted center section, the thickness of the leaf spring increases at a higher rate as it does closer to the ends of the leaf spring.

When considering the leaf spring being connected to the movable drive components at both opposite ends, the parabolic outer contour of the leaf spring advantageously can be defined by a pair of parabolas which are oriented, with their culmination point, towards opposite ends of the leaf spring.

Basically, it may suffice when one of the side surfaces of the leaf spring has a parabolic surface contour. However, it is also possible that both of opposite side surfaces of the leaf spring have such parabolic surface contour. More particularly, when considering a cross-section through the leaf spring taken along a plane perpendicular to the neutral axis, opposite surface contours of such cross-section may be defined by such pair of parabolas facing, with their culmination points, towards different ends of the leaf spring.

Thus, the aforementioned leaf springs of the spring device, when considering a cross-section thereof in a cross-sectional plane substantially parallel to the longitudinal axis of the leaf spring and parallel to the linear axis of movement of the drive unit, may have a contour the thickness of which increases towards the opposite ends of a leaf spring. More particularly, the leaf spring may have a minimum thickness in a center section from which the thickness continuously increases towards the opposite ends of the leaf spring.

So as to achieve an advantageous distribution of stresses within the spring element, the leaf springs may have a parabolic cross-sectional contour which may have a constriction or neck portion in a central section of the leaf spring from which constriction the thickness of the leaf spring increases in a parabolic way. More particularly, the leaf springs' cross-section may be defined by a pair of parabolas facing each other with their culmination points in a central region of the leaf spring forming the aforementioned constriction from which said pair of facing parabolas define the cross-sectional thickness increasing towards the leaf spring's opposite ends.

Due to such parabolic cross-sectional shape, the cross-sectional contour of the leaf spring is convex except the central restriction forming a transitional and/or connecting portion between the two parabolas, and may provide for a harmonic stress distribution.

Said constricted section around the culmination points of the two parabolas, forms a sort of transitional section in which the outer contour of the leaf spring may be concave. However, except such transitional section around the culmination points of the two facing parabolas, the outer contour of opposite side surfaces of the leaf spring may be convex and may have a shape defined by such parabolas.

In order to achieve a uniform stress distribution and substantially the same stress level in the surface layers of the leaf spring, the said parabolas defining the outer contour may be parabolas of a higher degree. More particularly, said parabolas are not defined by the common parabola definition $y=ax^2$, but may be defined as a parabola of the degree b, in particular by the equation $$y = \pm a\left(\frac{|x|}{mm}\right)^b \text{ or } y = \pm a\left(\frac{|x|}{inch}\right)^b$$

Using such parabolas of higher degree helps in achieving a rather constant stress level in the surface layer, in particular when the leaf spring is subject to multi-axial loading. For example, in addition to forces causing bending of the leaf springs in the intended direction of bending the leaf springs, additional forces such as any forces perpendicular to such usual bending forces and/or inertia stresses, may act upon the leaf springs.

The aforementioned parameter b defining the higher degree of the parabola, may vary depending on the geometry of the spring device and the characteristics of the attached drive components such as mass, desired amplitude or frequency. However, for a wide range of applications, the aforementioned parameter b advantageously may range from
$1<b<4$ or $2 \leq b \leq 3$,
wherein for linear drive units used to drive the tools of small electric appliances for personal care such as shavers a range of
$2<b<3$,
may be advantageous for said parameter b which may be chosen, e.g., to be around 2.5.

The other factor a defining the shape of the parabola of higher degree and thus the contour of the leaf spring, may vary depending on the length of the spring, the material of the spring, or the apparent yielding point. Advantageously, a good compromise for a wide range of applications, can be achieved with
$10 \text{ mm} \leq a \leq 50 \text{ mm}$ or $0.4 \text{ inch} \leq a \leq 2 \text{ inch}$,
wherein, however, the parameter a may be chosen to have a value outside the aforementioned range for certain applications.

For springs used for linear drive units for small electric appliances for personal care such as electric shavers or toothbrushes, it can be advantageous to choose said factor a to be within the following range:
$20 \text{ mm} \leq a \leq 40 \text{ mm}$ or $0.8 \text{ inch} \leq a \leq 1.6 \text{ inch}$.

When the spring device includes a plurality of leaf springs, it can be advantageous to choose the parameter a of the abovementioned parabola equation to be different for different leaf springs. For example, for a first leaf spring the parameter a may be chosen to range from 25 mm to 50 mm or 1.2 inch to 2 inch, whereas for a second leaf spring parameter a may be chosen to range from 10 mm to 25 mm or 0.4 inch to 1.2 inch.

As mentioned above, the cross-sectional contour of the leaf spring may not follow the parabolas' curves or may not be convex even in a transitional section around the culmination points of the two parabolas and/or a transitional section between the convex sections. More particularly, in said transitional center section of the leaf spring, the contour may be chosen to provide for a thickness of the leaf spring of at least 0.05 mm or 0.002 inch, wherein advantageously the thickness of the leaf spring in said transitional center section may range from 0.1 to 0.5 mm or 0.004 to 0.02 inch. Aside from such transitional section with a straight or concave contour, the surfaces of the leaf spring on opposite sides thereof may be convex and/or follow the aforementioned parabola shape.

For example, more than ⅔ or ¾ or ⅚ of the entire length of the leaf spring may have convex or parabolic surfaces.

In order to achieve direct transmission of the spring forces onto the drive components and good responsiveness of the spring device and to allow for easy mounting at the same time, it is suggested the spring device movably connecting the first and second drive components to each other includes a one-piece ring element made from plastic including at least one pair of leaf springs and a pair of cross-bars extending crosswise to said leaf springs and connecting said leaf springs to each other. Said leaf springs and cross-bars may be integrally connected to each other and form a one-piece structure having a homogeneous material distribution without welding seams, adhesion interfaces and similar irregularities.

Due to such ring structure of the spring device, stresses resulting from deformation of the leaf spring elements such as shearing stress can be taken up by the structure without overloading the connection to the drive components. Moreover, a rigid connection to the drive components can be achieved without use of heavy connectors with complicated structure. The total number of parts of the drive unit can be reduced and moreover, the distance or gap between the first and second drive components can be kept more constant.

Said one-piece ring element forming the spring device may form a closed ring structure with no gaps dividing two ring sectors from each other. Such closed ring structure provides for an even more rigid and stiff spring structure, allowing for high amplitudes at stable frequency. In the alternative, it would be possible, however, to use a slotted ring structure, wherein such slot in the ring can be bridged by one of the drive components attached to the ring structure.

Such ring element forming the first spring device may include at least one pair of leaf springs forming a pair of legs of the ring element on opposite sides thereof, wherein such spring legs are connected by a pair of crosswise extending cross-bars integrally connected to said spring legs. More particularly, a pair of horizontal upper and lower cross-bars may connect two pairs of vertical leaf springs so as to together form a closed ring element.

Said spring device may form a resonance spring allowing and helping the two drive components of the drive unit to oscillate at a natural frequency. More particularly, said spring device may connect a magnetic coil device forming a first drive component to a permanent magnet device forming the second drive component to each other in a way movable relative to each other in a basically linear way.

According to a further aspect, the ring element forming the spring device may be configured to allow for spring deformations only in the leaf spring elements and/or to restrict spring deformation to occur in the leaf spring elements only. More particularly, the cross-bars connecting the leaf spring elements to each other may be configured sufficiently rigid to resist stresses and forces coming from the leaf spring elements without being deformed significantly. The cross-bars are configured such that they can be considered as rigid bars when being subject to forces and stresses occurring during normal operation of the drive unit. Thus, spring movements and forces are controlled more precisely and consequently, large amplitudes at a stable frequency of the drive unit can be achieved. Moreover, the gap between the first and second drive components may be kept constant and rotatory misalignment between the first and second drive components can be avoided.

The aforementioned cross-bars of the ring element may have a cross-sectional thickness and/or a volume considerably larger than the cross-sectional thickness and/or volume of the leaf spring elements, wherein said cross-bars may be configured to be substantially rigid and to resist vibrations and/or movements of the leaf spring legs substantially without deformations. In particular, the cross-bars' sections connecting pairs of neighboring leaf spring elements may be configured to form a rigid, block-like connector between the leaf springs to keep vibrations and movements of the leaf springs restricted to the leaf springs, thereby achieving precise control of the oscillation and avoiding undesired influence of the leaf springs onto each other.

The spring device made of plastics may include mounting structures for easily connecting the first and second drive components to the one or more spring elements made of plastics, thereby allowing for easy mounting.

More particularly, the aforementioned cross-bars of the ring element may be provided with mounting structures for mounting the first and second drive components thereto. In particular, such mounting structures of the cross-bars may include press-fitting contours designed and adapted to the drive components' contours such that the drive components can be press-fitted onto the cross-bars of the ring element. Such press-fitting contour may include a recess in the plastic material of the cross-bars, into which recess a connector protrusion may be received in a press fit. For example, the cross-bar may include a substantial cylindrical hole into which a pin may be press-fitted. In the alternative, the cross-bars may include a press-fitting projection such as a press-fitting pin that can be press-fitted into a corresponding recess such as a substantially cylindrical hole of the drive components.

Said press-fitting and/or form-fitting contour may have other shapes more complex than a cylindrical bore receiving a pin. For example, at least one of the cross-bars may be provided with a T-shaped recess which may be of the type of a hollow extruded section to receive a complementary shaped or double T projection provided at one of the drive components, wherein said T-shaped recess and said T or double T-shaped projection may have dimensions providing for a press-fit when inserting the projection into the recess. So as to make axial positioning easier when inserting the projection into the recess, said T-shaped recess may be formed as a blind or pocket hole and/or may be provided with an axial stopper contour against which the projection to be inserted may be pressed. In addition or in the alternative, it also would be possible to provide such axial stopper contour at the T- or double T-shaped projection to be inserted into the recess, for example in terms of a radially extending collar.

In the alternative to a recess in the ring element to be matched with a projection of the drive component, the cross-bar of the ring spring element could be provided with a projection such as a T- or double T-shaped contour to be inserted into a T-shaped recess in the drive component.

The aforementioned press-fitting or form-fitting contours such as T- or double T-shaped contours matching with each other or similar, extruded-like contours may achieve high rigidity of the connection of the drive component to the ring element, in particular against torques and bending forces and thus, rotatory misalignment can be avoided.

In the alternative or in addition, the first and/or second drive component may be fixed to the ring element by means of an adhesive connection. For example, the first and/or second drive component may be glued to one of the cross-bars.

In addition or in the alternative, the first and/or second drive component may be fixed to the ring element by means of caulking or staking. For example, a hot caulking or staking connection or heat staking connection may be provided between each of the first and second drive components and the cross-bars of the ring element. When the ring element is made from thermoplastics, the drive component may be connected to the ring element by thermoplastic staking.

According to a further aspect, the spring device made from plastics may include a spring element made from a high-performance thermoplastics such as polysulfone (PSU) or polyether ether ketone (PEEK) or a polyphenylene sulfide (PPS). In particular, a long-chain PPS may be used to form the spring elements of the first spring device.

According to a further aspect, the closed ring element forming the spring device including the leaf spring elements may be formed entirely from plastics, in particular the aforementioned long-chain PPS. More particularly, such closed ring element may be formed as an integral, material homogeneous one-piece element made from plastic.

Said cross-bars and said leaf springs may be formed from the same material, in particular the aforementioned long-chain PPS to form a one-piece element having a homogeneous material distribution without irregularities such as welding seams or adhesion joints.

The aforementioned ring element may have a substantially rectangular shape comprising the aforementioned leaf springs and cross-bars connecting such leaf springs, wherein the leaf springs as well as the cross-bars may have a substantially straight, elongated contour, wherein the cross-bars may extend substantially perpendicular to the leaf springs, when considering the ring spring element in a non-deformed, neutral status.

So as to provide the spring device with sufficient rigidity and/or stiffness, the aforementioned ring element may include more than two leaf springs. More particularly, the ring element may include two or more pairs of leaf springs arranged on opposite sides and connected to each other by the aforementioned cross-bars. Such multiple pairs of leaf springs may extend substantially parallel to each other when the ring element is undeformed. The spacing between neighboring leaf springs on each side of the ring element may be considerably smaller than the spacing between the innermost leaf springs. In other words, the clear span or width of the ring element as measured in the direction crosswise to the longitudinal extension of the leaf springs in terms of a sort of inner diameter of the ring is considerably larger than the spacing between neighboring leaf springs on the left side or neighboring springs on the right side. For example, the inner width of the ring may be five or ten or more times larger than the gap between neighboring leaf springs on the left side or on the right side.

Such plurality of leaf springs may have different parabolic surface shapes. In particular, the aforementioned parameter a may vary from leaf spring to leaf spring. When there are at least two leaf springs on each side of the drive unit, an outer leaf spring may have a parabolic surface contour with said factor a being between 6.5 and 7.5, whereas an inner leaf spring along said side of the drive unit may have a parabolic surface shape with said factor a being from 8.5 to 9.5.

In addition to the aforementioned plastic spring device formed by said ring element, the drive unit may be provided with an additional second spring device (so consequently in the following, the aforementioned plastic spring device formed by the ring element is referred to a first spring device). Such additional second spring device may connect the first or second drive component to a further structural element of the drive unit and/or structural element of the electric appliance. In particular, such additional second spring device may form a suspension spring for suspending the drive unit movably from a mounting structure that may be fixed to a housing part of the electric appliance, wherein the second spring device may be connected to, with one of its ends, to said mounting structure and, with another one of its ends, to the first or second drive component or another drive unit component so that the entire drive unit may move relative to the mounting structure fixed to the housing part. Such spring suspension of the drive unit may help to prevent the housing subject to vibrations coming from the drive unit.

In order to achieve a sufficiently rigid and stiff drive unit structure that can be easily manufactured and mounted within the restricted space of a personal appliance's housing, it is suggested the first spring device in terms of the aforementioned ring element movably connecting the two drive components of the drive unit to each other includes one or more spring elements made from plastics, whereas the second spring device movably linking the drive unit to a structural component of the appliance includes one or more spring elements made from metal.

The second spring device including at least one metal spring element provides for sufficient rigidity and stiffness of the drive unit structure, thereby achieving efficient transmission of oscillation with stable amplitudes and desired frequencies.

Said second spring device may form a suspension spring device connecting said first or second drive component of the drive unit or another component of the drive unit to a mounting structure which mounting structure may be fixed to the appliance's housing or may be directly formed by the appliance's housing. Such suspension spring device formed by the second spring device may allow the entire drive unit to move relative to the mounting structure supporting the drive unit, wherein such mounting structure may be rigidly attached to or formed by the appliance's handle which may be formed by, for example, the shaver's housing or rigidly attached to or formed by the appliance's tool head.

The spring elements of the second spring devices may be formed as leaf springs which may extend along opposite sides of the drive unit and/or opposite sides of the first and second drive components thereof. More particularly, each spring element of the second spring device may consist of such leaf spring having an elongated, flattened, plate-like contour with a longitudinal axis extending substantially perpendicular or crosswise to the linear axis of movement of the drive unit.

The leaf spring elements of the first and second spring devices may extend substantially parallel to each other along opposite sides of the drive unit, at least when the drive components of the drive unit are in a neutral, non-operative position.

In the alternative to such parallel spring configuration, the second spring device connecting the drive unit to the mounting structure may include a pair of leaf springs being arranged inclined relative to each other, in particular having a V-like arrangement, wherein such leaf springs are positioned on opposite sides of the drive unit so that the drive unit is connected to opposite sides of the mounting structure by means of a leaf spring on each side.

Such leaf springs on opposite sides of the drive unit may be arranged so that longitudinal axes going through the leaf springs in a neutral position of the drive unit with the drive components being inactive, define an acute angle, wherein such acute angle between the longitudinal axes of the leaf springs may range from 2×0.5° to 2×25° or from 2×0.5° to 2×10° or from 2×1° to 2×5°.

According to a further aspect, the first spring device may be configured to have a spring stiffness significantly higher than the spring stiffness of the second spring device. More particularly, the first spring device may be configured more than twice as stiff as the second spring device. More particularly, the stiffness of the first spring device may be chosen to range from five times to fifteen times or eight times to twelve times larger than the spring stiffness of the second spring device.

Although the first spring device is made from plastics and the second spring device is made from steel, said first and second spring devices are designed such that the first spring device has a significantly higher spring stiffness than the second spring device. So as to have such increased spring stiffness, the first spring device may include spring elements having an increased thickness and/or increased dimensions in comparison to the spring element of the second spring device. In the alternative or in addition, the first spring device may include a higher number of spring elements than the second spring device, wherein such multiple spring elements of the first spring device may be arranged to be effective in parallel to each other so that the individual spring stiffness of each spring element sum up to the entire spring stiffness of the first spring device.

For example, the second spring device may consist of two metal leaf springs, whereas the first spring device may include at least four plastic leaf springs.

Due to the aforementioned configuration of the spring stiffness of the first spring device being significantly higher than the spring stiffness of the second spring device, a stable oscillation with high amplitudes of the first spring device can be achieved and, at the same time, vibrations of the drive unit can be prevented from being transmitted to the structural component of the appliance to which the drive unit is linked by means of the second spring device.

So as to avoid negative influence of the first and second spring devices onto each other, the first spring device may be decoupled or uncoupled from the second spring device in terms of vibrations or oscillations of the spring elements of the first spring device being transmitted to the second spring device and/or vibrations or oscillations of the spring elements of the second spring device being transmitted onto the first spring device. Such oscillative or vibrative uncoupling of the first and second spring devices from each other, may be achieved by means of a vibration barrier between the first and second spring devices to prevent transmission of vibrations of the first spring device to the second spring device and vice versa. Such vibration barrier may include a rigid, stiff element separating the two spring devices from each other, wherein such rigid, stiff element may be formed from metal. More generally, such vibration barrier may include a separation element configured to resist stresses and forces implied by the vibrating spring elements substantially without being deformed or being moved.

For example, said vibration barrier may include a metal plate to which the second spring device is connected, which metal plate is, on the other hand, rigidly connected to one of the drive components which are connected relative to each other by means of the first spring device.

Contrary to the leaf spring elements of the first spring device, the second spring device may have leaf springs having a substantially rectangular cross-section, when considering a cross-sectional plane substantially parallel to the longitudinal axis of the leaf spring's end parallel to the linear movement axis of the drive unit, and/or a thickness substantially constant along the longitudinal axis of the leaf springs.

The aforementioned leaf springs of the second spring device each may have a connection point to the mounting structure and a connection point to the drive unit, wherein the connection to the mounting structure may be positioned somewhere between the drive unit and the shaver head and the connection point to the drive unit may be positioned somewhere in a region of the drive unit opposite to the shaver head.

In addition or in the alternative, the aforementioned leaf springs of the second spring device may extend along substantially the entire side of the drive unit, wherein each of the leaf springs may extend along at least 50% or even 75% of the drive unit when considering the longitudinal extension thereof measured along the longitudinal axis of the handpiece.

According to a more generalized aspect, the second spring device may include a pair of spring elements supporting the drive unit relative to the mounting structure and defining a four point joint supporting the drive unit. The spring elements may form a spring bar linkage and/or a pendulum bearing for the drive unit.

The electric appliance for personal care may be an electric shaver including a handpiece formed by a shaver housing and a shaver head pivotably supported onto said handpiece about one or more pivot axes allowing for self-adaption of the shaver head to the contour of the skin to be shaved.

The shaver head may include only one cutter element, but the shaver head also may include two, three or more cutter elements. The shaver head may include further cutting or non-cutting functional elements such as a thermal element for cooling or heating a skin portion to be shaved, or a long-hair cutter, or fluid applicators to apply fluids such as deodorants, balms or lubricants onto the skin.

The transmission train for transmitting the drive power and movements of the electric linear motor to the at least one cutter element may have varying architectures and structures depending on the type of motor and the arrangement thereof. For example, the drive unit may include a reciprocating pin coupled to the aforementioned cutter element or undercutter directly or via an oscillation bridge allowing for pivoting of the cutter element relative to the angular orientation of the longitudinal axis of said pin.

These and other features become more apparent from the example shown in the drawings.

As can be seen from FIG. 1, shaver 1 may have a shaver housing 2 forming a handpiece for holding the shaver, which shaver housing 2 may have different shapes such as— roughly speaking—a substantially cylindrical shape or box shape or bone shape allowing for ergonomically grabbing and holding the shaver, wherein such shaver housing has a longitudinal shaver housing axis 25 due to the elongated shape of such housing, cf. FIG. 1.

On one end of the shaver housing 2, a shaver head 3 is attached to the shaver housing 2, wherein the shaver head 3 can be pivotably supported about a shaver head pivot axis x extending substantially perpendicular to the aforementioned longitudinal shaver housing axis and/or about an axis y perpendicular to said axis x. The shaver housing 2 may have a pair of support arms projecting from the shaver head end of the shaver housing 2 between which support arms a carrier structure of the shaver head 3, for example in terms of a shaver head frame, can be pivotably mounted about said shaver head pivot axis x.

As can be seen from FIG. 1, the shaver head 3 may include a pair of cutter elements 4, wherein only one or three or more of such cutter elements 4 may be provided. Such cutter elements 4 may form block-like undercutters with a plurality of shearing blades cooperating with a shear foil covering the respective cutter elements 4. The said cutter elements 4 may have an elongated shape with a longitudinal axis extending substantially parallel to the aforementioned shaver head pivot axis and/or substantially parallel to the cutting oscillation axis 8 along which the cutter elements 4 are driven in an oscillating manner.

Figure 2:
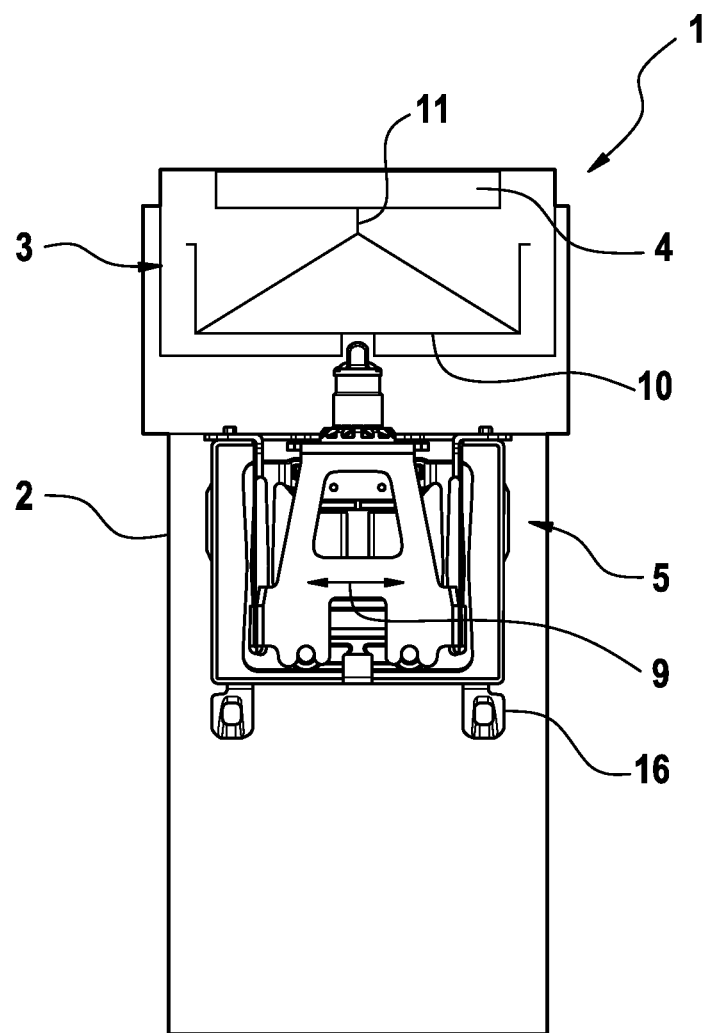
FIG. 2: is a plane view of a drive unit including magnetic-type drive components supported for linear oscillation and the surrounding mounting structure of the electric appliance of FIG. 1, FIG. 3: is a plane view of the drive unit of FIG. 2, showing a first spring device connecting the two magnetic drive components of the drive unit to each other and a second spring device connecting the drive unit to a mounting structure of the electric appliance.

As can be seen from FIG. 2, the drive unit 5 which may be received within the shaver housing 2 to drive the cutter elements 4 at the shaver head 3, is of the linear oscillating type and may include a first drive component 6 and a second drive component 7 which may oscillate relative to each other along an oscillation axis 9. Said first drive component 6 may form an active drive component coupled to the aforementioned cutter elements 4 by means of a transmitter 10 which may include a transmitter pin 11 extending from the drive unit 5 towards the shaver head 3. Such transmitter pin 11 may be directly coupled to the cutter elements 4, for example by means of a pivot bearing allowing for an additional transverse degree of freedom to compensate for pivoting of the shaver head 3. In the alternative, the transmitter 10 may include further transmission components such as a transmission bridge as it is per se known in the art.

As shown by FIG. 2, said second drive component 7 may include one or more oscillating, magnetic coils 12, whereas the first drive component 6 may include one or more permanent magnets 13, wherein, however, an opposite arrangement may be chosen with the coils 12 associated with the first drive component 6 and the permanent magnets 13 associated with the second drive component 7.

Said first and second drive components 6 and 7 may be supported movably relative to each other by means of a first spring device 14 allowing movements of the first and second drive components 6 and 7 along the drive unit's 5 oscillation axis 9 extending substantially parallel to the cutter oscillation axis 8. Said movements of the first and second drive components 6 and 7 relative to each other along the oscillation axis 9 can be considered as linear movement.

Said first spring device 14 may include one or more resonance springs arranged between the first and second drive components 6 and 7 to promote oscillation of the first and second drive components 6 and 7 relative to each other at natural frequency.

More particularly, said resonance springs of the first spring device 14 may be formed by one or more leaf springs 15 extending with their longitudinal axis substantially perpendicular to the aforementioned oscillation axis 9 of the drive unit and connecting the first and second drive components 6 and 7 to each other. More particularly, at least one pair of such leaf springs 15 may extend on opposite sides of said first and second drive components 6 and 7, wherein said leaf springs 15, at one end, are connected to the first drive component 6 and, at the opposite end, are connected to the second drive component 7.

The leaf springs 15 may bend to allow linear oscillation of the drive components 6 and 7 relative to each other. Thus, both drive components 6 and 7 may execute linear oscillation, wherein such oscillation is effected in a sort of reverse motion. When the first drive component 6 moves to the left, the second drive component 7 moves to the right and vice versa.

Figure 5:
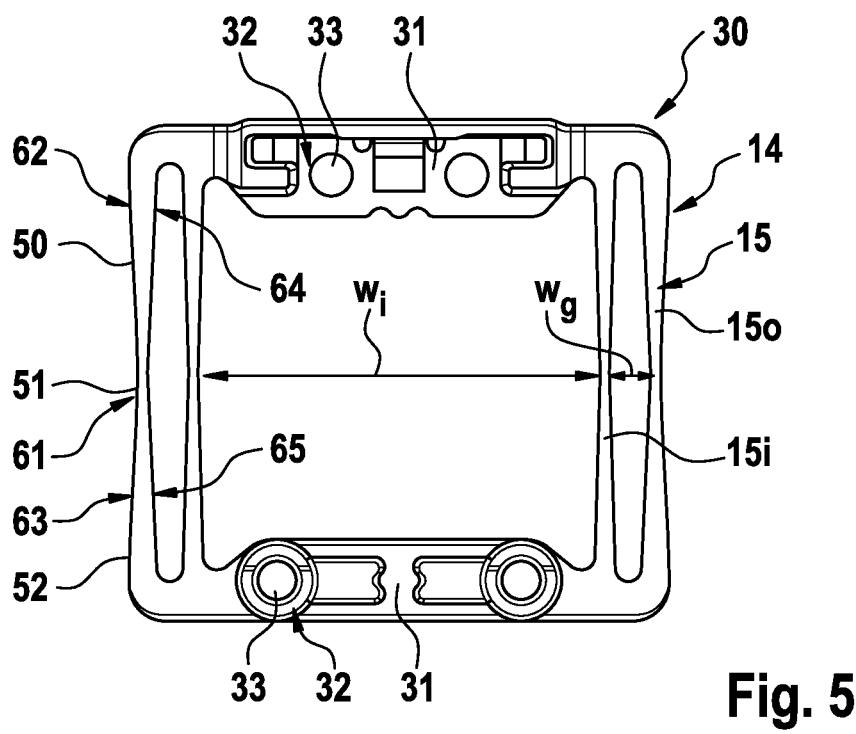
FIG. 5: a plane view of the first spring device of the drive unit of FIG. 4, FIG. 6: a partly exploded, perspective view of the ring spring and the attachments to be press-fitted therewith

More particularly, as shown by FIG. 5, the first spring device 14 and the leaf springs 15 thereof may be formed by a ring-shaped spring element 30, wherein said leaf springs 15 form a pair of legs of such ring element 30 on opposite sides thereof. Said ring element 30 further may include a pair of cross-bars or cross elements 31 extending substantially perpendicular to the longitudinal axis of the leaf springs 15 and connecting said leaf springs 15 to each other. As can be seen from FIG. 5, said ring element 30 may have a substantially rectangular contour formed by a pair of cross-bars 31 spaced from each other and said leaf springs 15.

The aforementioned cross-bars 31 may be configured to be substantially rigid to resist stresses and forces caused by bending and oscillation of the leaf springs 15 substantially without deformations. As can be seen from FIG. 5, said cross-bars 31 may have a thickness and/or volume significantly larger than the thickness and/or volume of the leaf springs 15. For example, the cross-sectional area of the cross-bars 31 (when considering a cross-section perpendicular to the cross-bars' longitudinal extension) may multiple times larger than the cross-sectional area of the leaf springs 15 (when considering a cross-section in a plane substantially perpendicular to the leaf springs' longitudinal extension).

According to an advantageous aspect, said cross-bars 31 may be provided with a mounting structure and/or mounting contours 32 for mounting the drive components 6 and 7 thereto. Such mounting contours 32 may be adapted to mounting contours of said drive components 6 and 7 to snugly fit therewith and/or to achieve form-fitting of the cross-bars 31 with the drive components 6 and 7. More particularly, such mounting contours 32 may include a press-fitting contour to be press-fitted with a corresponding press-fitting contour at the drive components 6 and 7. For example, such press-fitting contour of the cross-bars 31 of the spring ring element 30 may include a press-fitting recess 33 such as a hole or a substantially cylindrical bore in the cross-bar 31 to be press-fitted with a corresponding press-fitting projection such as a press-fitting pin 34 provided at the respective drive component 6 or 7. In addition or in the alternative, the cross-bars 31 may be provided with a press-fitting projection such as a press-fitting pin to be press-fitted with a press-fitting recess provided in the drive components 6 and 7.

Figure 6:
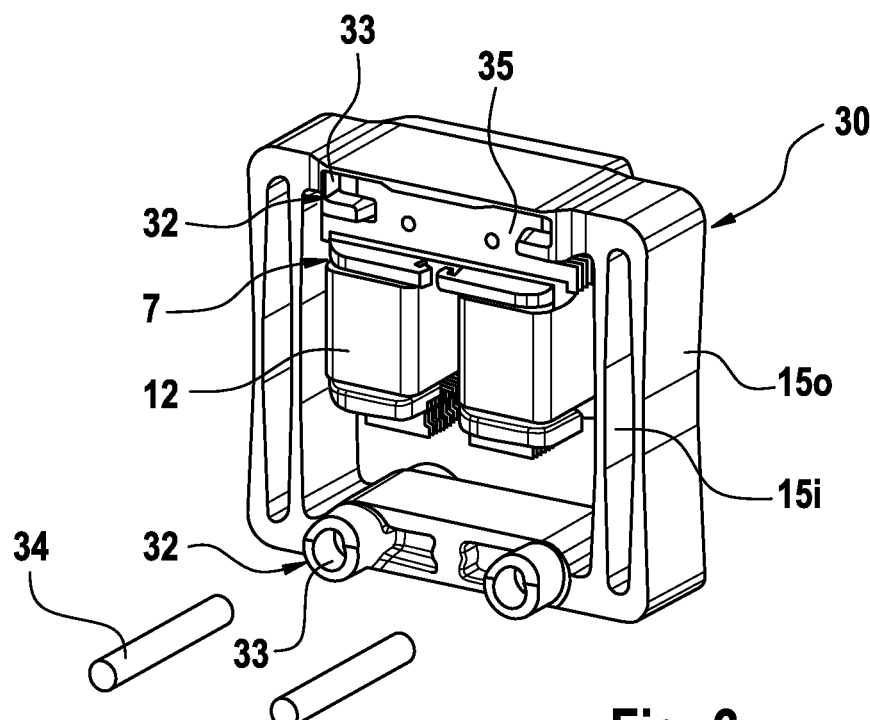

As can be seen from FIG. 6, at least one of the cross-bars 31 may be provided with a more complex press-fitting contour. In particular, the cross-bar to be connected with the second drive component 7 including the magnetic coils 12 may be provided with a T-shaped recess 33 into which a T- or double T-shaped projection 35 of the second drive component 7 can be inserted to achieve a press-fit connection. In addition or in the alternative, it also would be possible to provide the other cross-bar with such more complex, extruded-like contour to be press-fitted with a complementary contour of the first drive component 6.

As can be seen from FIG. 6, the aforementioned mounting contours 32 may include a plurality of press-fitting contours 33 on each cross-bar 31, wherein such press-fitting contours may be configured to have a fitting axis substantially perpendicular to the longitudinal extension of the cross-bars 31 and/or substantially perpendicular to the oscillation axis 9 of the drive unit 5 and/or substantially perpendicular to the plane defined by the ring element 30. Said fitting axis means the direction in which the press-fitting pin 34 can be inserted into the corresponding press-fitting recess.

Basically, the drive components 6 and 7 could be fixed to said cross-bars 31 by means of other fixation means such as bolts, screws, rivets or adhesives. To reduce the number or parts and the mounting steps, the drive components 6 and 7 can be rigidly fixed to the cross-bars 31 of the spring ring element 30 by means of the aforementioned complementary press-fitting contours.

In addition or in the alternative to such press-fitting contours, one or both of the drive components 6 and 7 can be connected to the ring element 30 by means of hot caulking or heat staking.

Said ring-shaped first spring device 14 including the cross-bars 31 and the leaf springs 15 may be formed from plastic as a one-piece element without inhomogeneities such as welding seams or adhesion irregularities. In particular, the entire first spring device 14 may be formed from long-chained PPS.

To give the leaf springs 15 sufficient spring stiffness, two pairs of leaf springs may be arranged in parallel to each other. More particularly, two or more leaf springs 15 may be provided on a left side of the first and second drive components 6 and 7 and two or more leaf springs 15 may be provided on a right side of said first and second drive components 6 and 7.

As can be seen from FIG. 5, the distance between neighboring leaf springs $15i$ and $15o$ on each side of the ring element 30 is considerably smaller than the inner width of the ring element 30. For example, said inner width $w_i$ may be five times or ten times or more larger than the width $w_g$ of the gap between said neighboring springs $15i$ and $15o$.

Each pair of such lateral leaf springs 15*i* and 15*o* may extend substantially parallel to each other and crosswise to the oscillation axis, wherein an inner leaf spring 15*i* and an outer leaf spring 15*o* of such pair of leaf springs may have shapes and/or dimensions and/or contours different from each other to provide for different spring characteristics although such inner and outer leaf springs are formed from the same material.

More particularly, each of said leaf springs 15 may have a center section 15*c* or middle section with a reduced thickness or cross-sectional area, wherein the leaf springs' 15 thickness and/or cross-sectional area may continuously increase from said center section 15*c* towards the opposite ends of the leaf spring 15.

Figure 7:
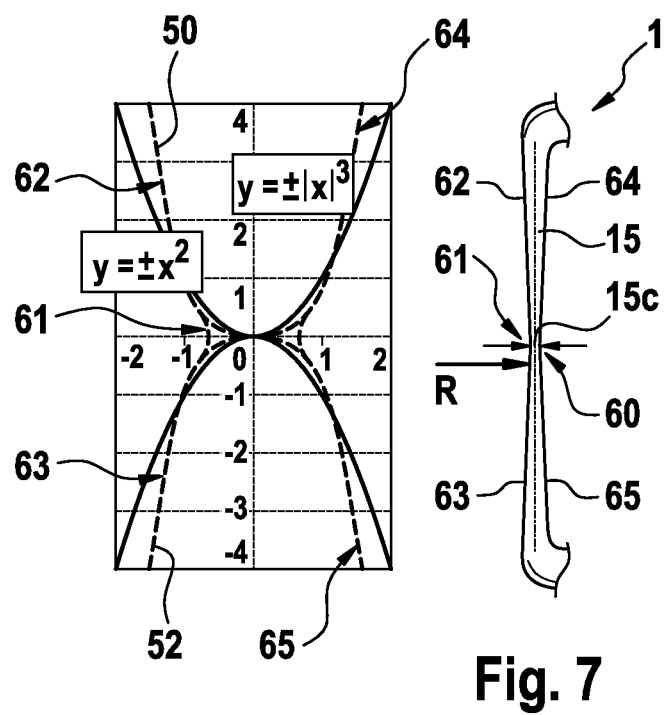
FIG. 7: a schematic cross-sectional view of a leaf spring of the spring device showing the outer contour defined by two parabolas.
Figure 8:
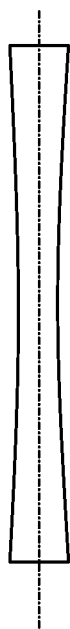
FIG. 8: a schematic cross-sectional view of a prior art leaf spring having a waisted shape with concave outer surfaces of the leaf spring.

Contrary to the waisted shape of a prior art leaf spring providing for concave surfaces substantially over the entire length of the leaf spring, as it is shown by FIG. 8, said leaf springs 15 have convex surfaces neighboring the constricted section 61 in the central region 60 of the leaf spring 15 forming the "waist" of the leaf spring 15. More particularly, the main surface 62, 63, 64, 65 of the leaf spring which main surfaces 62, 63, 64, 65 extend from said constricted section 61 towards opposite ends of the leaf spring 15 may be formed with a convex contour as it is shown by FIG. 7. Said main surfaces 62, 63, 64, 65 are the wider surfaces of the leaf spring 15 on opposite sides thereof (when considering that a leaf spring, like a leaf, has a pair of relatively wide surfaces and four narrow or small side surfaces connecting said main surfaces) and may extend substantially parallel to a neutral axis of the leaf spring 15 when considering said leaf spring being bended.

The leaf spring 15 may have convex main surfaces substantially over the entire length of the leaf spring 15 except the transitional region around the neck or constricted section 61 of the leaf spring 15 in the central region 60 thereof. As can be seen from FIG. 7, the leaf spring 15 may have four surface sections 62, 63, 64, 65 extending from the constricted section 61 to opposite ends of the leaf spring 15 on opposite sides thereof, wherein said four surfaces 62, 63, 64, 65 may have a convex shape. Thus, the thickness of the leaf spring 15 slightly increases from the minimum value given in the constricted section 61 towards the opposite ends of the leaf spring 15, wherein the rate of increase in thickness slightly becomes smaller towards the ends of the leaf spring 15.

According to an aspect, at least one surface of said leaf spring 15 may have a parabolic contour so that said surface is convex. More particularly, said at least one surface may have a contour defined by a pair of parabolas 50, 52 facing each other with their culmination point, wherein in a transitional region around the culmination points facing each other the contour may deviate from said parabolic shape to form, for example, a neck-shaped connection 51 between said two parabolas, cf. FIG. 7.

According to a further aspect, inner and outer surfaces of the leaf springs 15 facing and facing away from the drive components 6 and 7 (in other words, left and right surfaces of the leaf springs 15 in FIG. 5) may have a parabolic contour defined by two parabolas 50, 52 having culmination points facing each other. Said parabolas defining the outer contours of the leaf springs 15 may be of higher degrees.

As shown by FIG. 7, said parabolas 50 and 52 may be parabolas of a higher degree defined by the equation $$y = \pm a\left(\frac{|x|}{\text{mm}}\right)^b \text{ or } y = \pm a\left(\frac{|x|}{\text{inch}}\right)^b$$

FIG. 7 shows a comparison between two parabolas, wherein the parabola shown in full lines is a "normal" parabola defined by the equation $y=ax^2$, whereas the second parabola 50 and 52 shown by the broken lines is a parabola of a higher degree defined $y=ax^3$.

Generally, parabola of higher degree may be defined by the equation $$y = \pm a\left(\frac{|x|}{\text{mm}}\right)^b \text{ or } y = \pm a\left(\frac{|x|}{\text{inch}}\right)^b$$

wherein said parameters a and b are advantageously chosen to be within the aforementioned ranges.

As shown by the right side of FIG. 7, the center section 15*c* of the leaf spring corresponding to the transitional section around the culmination points of the parabolas 50 and 52 is chosen to have a thickness R ranging from 0.1 to 0.5 mm. In such transitional center section 15*c*, the cross-sectional contour of the leaf spring may not follow exactly the two parabolas 50 and 52, as it is shown by the left side of FIG. 7.

So as to give the inner and outer leaf springs 15*i* and 15*o* different spring characteristics, different parabolas may define the outer contours of said inner and outer leaf springs 15*i* and 15*o*.

In addition to such first spring device 14, a second spring device 17 may be provided for movably linking one of the first and second drive components 6 and 7 or another part of the drive unit 5 to a further structural part of the electric appliance, wherein such second spring device 17 may include a pair of leaf springs 18 that may form suspension springs for suspending the drive unit 5. More particularly, the drive unit 5 may be supported onto a mounting structure 16 by means of said second spring device 17.

Said mounting structure 16 may be a frame structure surrounding the drive unit 5, wherein such mounting frame may form a closed ring or rectangle surrounding the drive unit 5. Said mounting structure 16 may be rigidly fixed to the shaver housing 2, for example by means of mounting flanges, or may be held in the shaver housing 2 in a fixed position by means of suitable fixation means such as screws or latching means. Said mounting structure also may be formed directly by the shaver housing 2.

More particularly, such second spring device 17 may include a pair of leaf springs 18 which may extend substantially parallel to each other on opposite sides of the drive unit 5, said leaf springs 18 each having a connection point 29 to the first drive component 6 and a connection point 30 to the mounting structure 16. Such second set of leaf springs 18 forms a sort of bridge extending from the first drive component 6 to the mounting structure 16, thus forming a sort of pendulum bearing 27.

Figure 3:
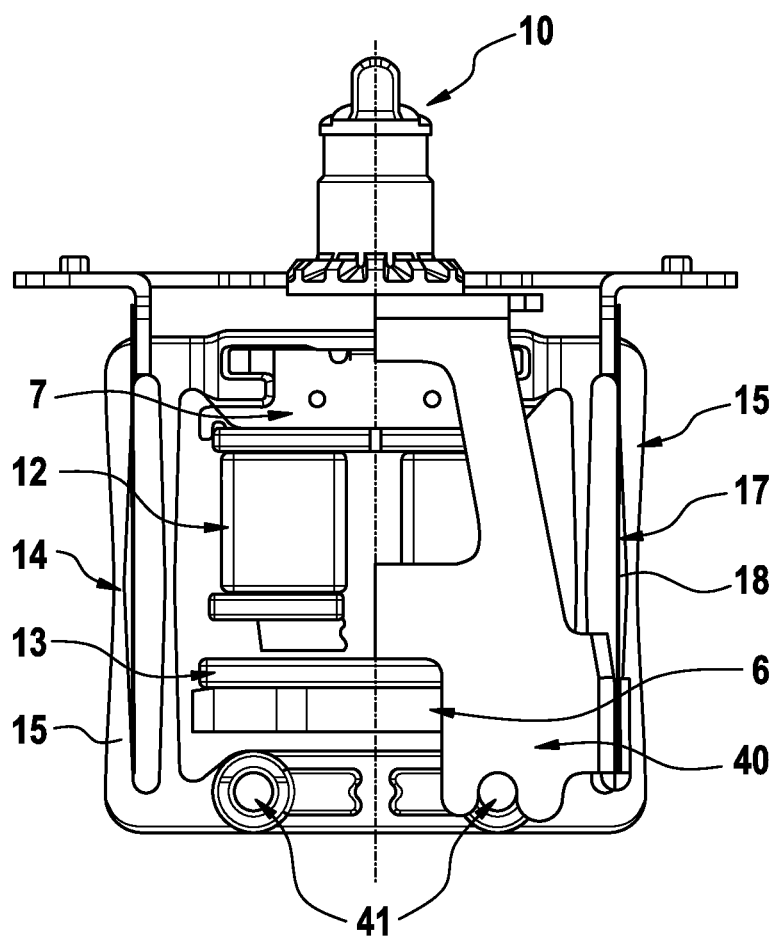
Figure 4:
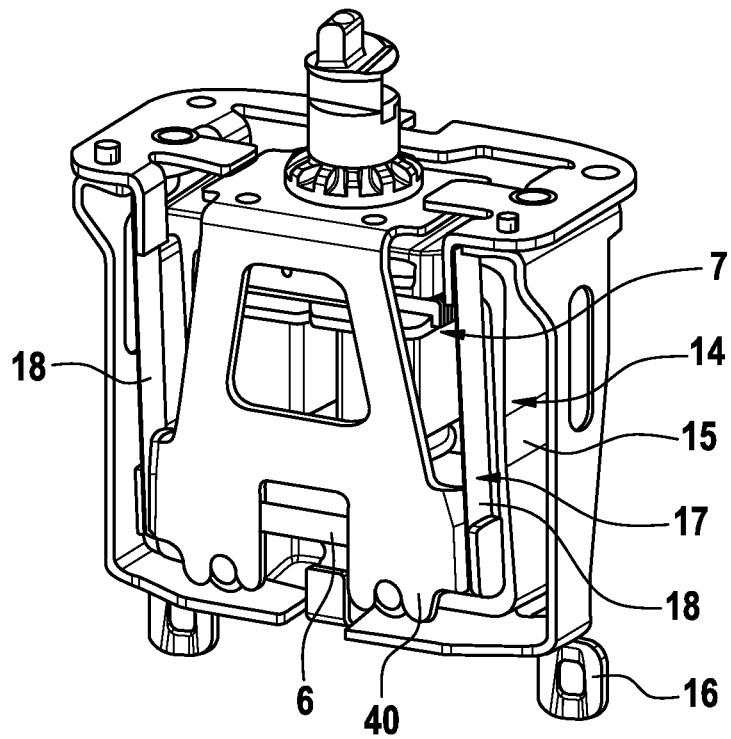
FIG. 4: a perspective view of the drive unit of FIG. 3, showing the first and second spring devices.

As can be seen from FIGS. 3 and 4, said leaf springs 18 of the second spring device 17 may extend substantially parallel to each other and/or substantially perpendicular to the oscillation axis 9 of the drive unit 5, at least when considering a neutral position of the drive unit 5 in an inactive status thereof.

Contrary to FIGS. 2 and 3, said leaf springs 18 of the second spring device 17 may extend at an acute angle when the drive unit 5 is in a rotary home position, i.e. the neutral position held by the leaf springs 28 of drive support 17 with the drive components 6 and 7 being inactive.

The leaf springs 18 of the second spring device 17 may be formed from metal, in particular steel.

Furthermore, said leaf springs 18 may have a substantially rectangular cross-section remaining substantially the same along the longitudinal extension of the leaf springs 18. In particular, said leaf springs 18 may be formed as thin, elongated steel plates. Said metal leaf springs 18 of the second spring device 17 may have a thickness and/or cross-sectional area considerably smaller than the thickness and/or cross-sectional area of the leaf springs 15 of the first spring device 14.

According to a further aspect, the first and second spring devices 14 and 17 may be uncoupled from each other and/or separated from each other in terms of vibrational influencing. More particularly, a vibration barrier 40 may be provided between the first spring device 14 and the second spring device 17, wherein such vibration barrier 40 may be formed by a rigid element having sufficient dimensions to resist vibrations and/or stresses coming from one of the first and second spring devices. More particularly, such vibration barrier 40 may be configured in terms of rigidity and mass so as to not transmit oscillations of one of the first and second spring devices to another one of said first and second spring devices.

For example, such vibration barrier 40 may be formed by a rigid structural element which may be made of metal such as steel, which structural plate-like element may form a connection of the second spring device 17 to the first spring device 14 and/or one of the drive components 6 and 7. As can be seen from FIG. 3, such structural element forming the vibration barrier 40 may be rigidly connected to the crossbar 31 of the ring spring element 30 of the first spring device 14 by means of a pair of press-fitting pins 41.

Said vibration barrier 40 may be formed by a part of the transmitter 10 transmitting the linear movements of the drive unit 5 to the cutter element 4 of the shaver 1.

Due to the different materials from which the first spring device 14 and the second spring device 17 are made, sufficient stiffness of the spring structure can be achieved so as to allow for efficient transmission of the amplitudes to the cutter element 4, without sacrificing easy mounting and manufacturing. In particular, in comparison to a spring structure where both the first spring device and the second spring device is made from plastics, a spring stiffness and/or drive stiffness which is more than ten times higher can be achieved by means of using steel springs for the second spring device 17 in combination with plastic springs for the first spring device 14.

The shaver head 3 may include further functional elements such as a long-hair cutter which may be arranged between the aforementioned pair of cutter elements 4.

The cutter elements 4 can be driven in an oscillating manner along cutting oscillation axis 8. In addition to such cutting movements, the cutting elements 4 can be pivotable and movable in directions transverse to said cutting oscillation axis 8.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An electric appliance for personal care comprising a magnetic linear drive unit having first and second drive components connected to each other by a spring device for linear oscillation relative to each other and adapted to magnetically interact with each other, wherein said spring device includes a leaf spring comprising a pair of opposing main surfaces and a constricted section in a central region of the leaf spring, wherein each of the opposing main surfaces of said leaf spring has a convex shape such that the convex shape starts at the constricted section and extends outwardly, and wherein said convex shape of each of said convex main surfaces is a parabolic shape.

2. The electric appliance according to claim 1, wherein said pair of convex main surfaces of the leaf spring comprises a first pair of convex main surfaces and further comprising a second pair of convex main surfaces, wherein said first and second pairs of convex main surfaces extend from said constricted section to opposite ends of said leaf spring on opposite sides thereof, so that, when considering a cross-section taken in a plane perpendicular to a neutral axis of the leaf spring, said leaf spring has a thickness increasing from said constricted section towards opposite ends of the leaf spring.

3. The electric appliance according to claim 2, wherein more than ⅔ of an entire length of a side of the leaf spring has convex main surfaces.

4. The electric appliance according to claim 1, wherein said pair of convex main surfaces of the leaf spring comprises a first pair of convex main surfaces and further comprising a second pair of convex main surfaces, wherein the first and second pairs of convex main surfaces are defined by portions of a pair of parabolas facing each other.

5. The electric appliance according to claim 1, wherein said pair of convex main surfaces of the leaf spring comprises a first pair of convex main surfaces and further comprising a second pair of convex main surfaces, said first and second pairs of convex main surfaces of said leaf spring, when considering a cross-section taken in a plane perpendicular to a neutral axis of said leaf spring, are defined by portions of a pair of parabolas facing each other.

6. The electric appliance according to claim 1, wherein the pair of convex main surfaces of the leaf spring comprises a first pair of convex main surfaces and further comprising a second pair of convex main surfaces, wherein the first and second pairs of convex main surfaces of said leaf spring are defined by portions of a pair of parabolas of higher degree defined by the equation $$y = \pm a\left(\frac{|x|}{\text{mm}}\right)^b$$

wherein 10 mm ≤a ≤50 mm and 1 <b <4,
or by the equation $$y = \pm a\left(\frac{|x|}{\text{inch}}\right)^b$$

wherein 0.4 inch ≤a ≤2 inch and 1 <b <4.

7. The electric appliance according to claim 6, wherein 20 mm ≤a <40 mm and 2 ≤b ≤3, or 0.8 inch ≤a ≤1.6 inch and 2 ≤b ≤3.

8. The electric appliance according to claim 6, wherein for an inner leaf spring, parameter a of the equation ranges from about 26 mm to about 50 mm, whereas for an outer leaf spring said parameter a ranges from about 10 mm to about 25 mm.

9. The electric appliance according to claim 1, wherein a thickness (R) of said leaf spring in a center section thereof ranges from about 0.1 to about 0.5 mm or about 0.004 to about 0.02 inch.

10. The electric appliance according to claim 1, wherein said spring device is formed by a ring element surrounding said drive unit and made in one piece from plastic including at least one pair of leaf springs and a pair of cross-bars extending crosswise to said leaf springs and connecting said leaf springs to each other.

11. The electric appliance according to claim 10, wherein said cross-bars include mounting contours adapted to form-fit and press-fit with mounting contours of the first and second drive components.

12. The electric appliance according to claim 10, wherein the spring device includes two or more leaf springs on each of opposite sides of the ring element, wherein leaf springs on the same side of the ring element have different contours.

13. The electric appliance according to claim 10, wherein said cross-bars of the ring element are configured to be rigid and to resist stresses and forces of the drive unit in the operational status substantially without deformations of said cross-bars.

14. The electric appliance according to claim 1, wherein said leaf spring of the spring device forms a resonance spring device helping the first and second drive components to oscillate at a natural frequency.

15. The electric appliance according to claim 1, wherein the spring device is made of long-chained polyphenylene sulfide PPS.

16. The electric appliance according to claim 1, further comprising a second spring device for connecting the first or the second drive component or a further component of the drive unit to a structural part of the electric appliance.

17. The electric appliance according to claim 16, wherein said second spring device includes one or more spring elements made from metal and formed as leaf springs with a longitudinal axis thereof extending crosswise to the oscillation axis of the drive unit.

18. The electric appliance according to claim 16, wherein the first spring device made of plastic is configured to have a spring stiffness being at least twice as large as the spring stiffness of the second spring device made of metal.

19. The electric appliance according to claim 16, wherein the second spring device comprises two metal leaf springs whereas the first spring device includes at least four plastic leaf springs.

20. The electric appliance according to claim 16, wherein the first spring device is decoupled from the second spring device in terms of vibrations and oscillations of the spring elements thereof by a vibration barrier arranged between said first and second spring devices, wherein said vibration barrier is formed by a rigid part of a drive transmitter structure for transmitting the oscillation of the drive unit to an appliance tool.

21. The electric appliance according to claim 1, wherein said leaf spring further comprises a pair of narrow surfaces each of which is defined by a first dimension and a second dimension transverse to the first dimension, wherein each of said convex main surfaces is defined by a third dimension and a fourth dimension, wherein the third dimension is parallel to the first dimension and transverse to the second dimension and the fourth dimension is transverse to the first, second and third dimensions, wherein the fourth dimension is greater than the second dimension.

22. A magnetic linear drive unit for driving a reciprocating tool of an electric appliance, said magnetic linear drive unit comprising first and second drive components connected to each other by a spring device for linear oscillation relative to each other and adapted to magnetically interact with each other, wherein said spring device includes at least one leaf spring having a constricted section in a central region of the leaf spring, wherein surfaces of said at least one leaf spring neighboring said constricted section are shaped convex, wherein said convex shape of each of said surfaces is a parabolic shape.

* * * * *